(12) United States Patent
Baehrle-Miller et al.

(10) Patent No.: US 8,552,676 B2
(45) Date of Patent: Oct. 8, 2013

(54) METHOD FOR MEASURING AN OPERATING VARIABLE AT MULTIPLE ELECTRIC MOTORS OF AN AUTOMATIC PARKING BRAKE

(75) Inventors: Frank Baehrle-Miller, Schoenaich (DE); Dieter Blattert, Kircheim/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 348 days.

(21) Appl. No.: 13/004,726

(22) Filed: Jan. 11, 2011

(65) Prior Publication Data

US 2011/0181224 A1    Jul. 28, 2011

(30) Foreign Application Priority Data

Jan. 22, 2010   (DE) .......................... 10 2010 001 134

(51) Int. Cl.
*G01R 31/02*   (2006.01)

(52) U.S. Cl.
USPC ..................... 318/490; 318/761; 318/400.21

(58) Field of Classification Search
USPC ............... 318/490, 761, 400.21; 180/65.239
See application file for complete search history.

(56) References Cited

U.S. PATENT DOCUMENTS

| 3,906,315 | A  | * | 9/1975 | Gotisar ........................ 318/761 |
| 2004/0135437 | A1 | * | 7/2004 | Mohr et al. .................... 307/38 |
| 2009/0198427 | A1 | * | 8/2009 | Jackson et al. ................. 701/70 |

\* cited by examiner

*Primary Examiner* — Karen Masih
(74) *Attorney, Agent, or Firm* — Kenyon & Kenyon LLP

(57) ABSTRACT

A method for measuring at least one operating variable at multiple electric motors of an automatic parking brake with the aid of a sensor system, the signals generated by the sensor system being processed by a processing device. To minimize the influence of signal interferences, the at least one operating variable is not measured or is not further processed as long as none of the electric motors is activated.

19 Claims, 3 Drawing Sheets

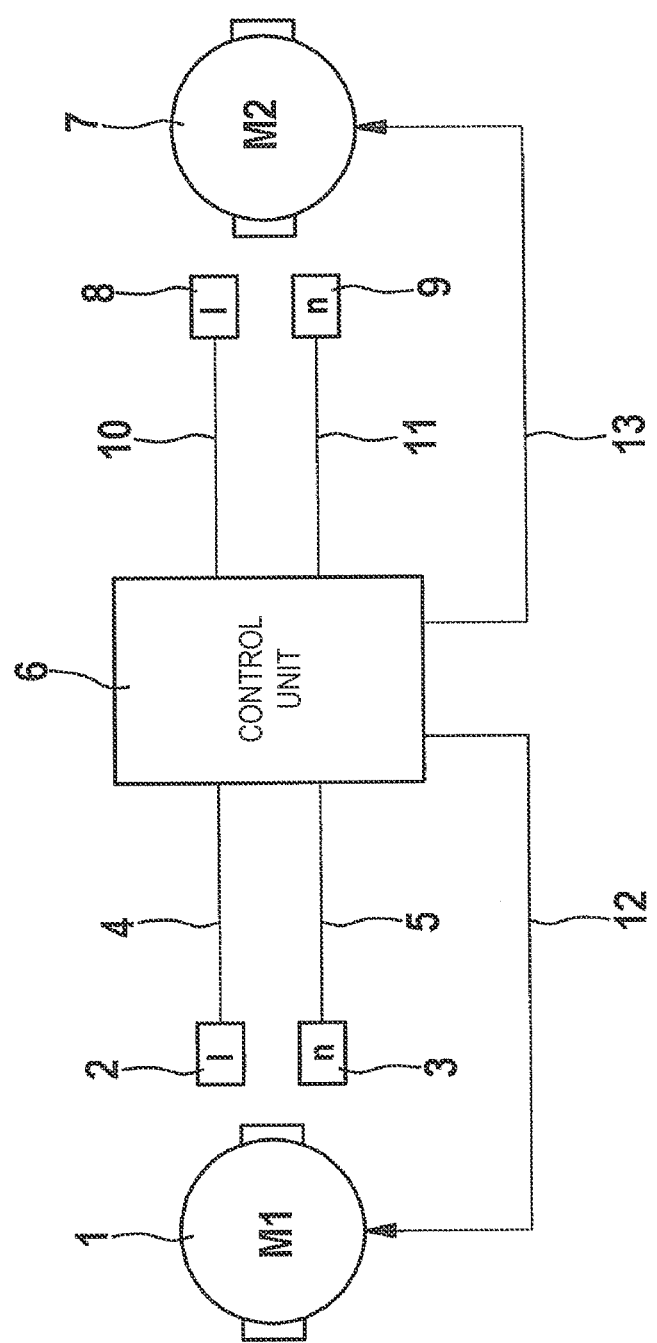

METHOD FOR MEASURING AN OPERATING VARIABLE AT MULTIPLE ELECTRIC MOTORS OF AN AUTOMATIC PARKING BRAKE

FIELD OF THE INVENTION

The present invention relates to a method for measuring at least one operating variable at multiple electric motors of an automatic parking brake.

BACKGROUND INFORMATION

Known parking brakes customarily include multiple electric motors for clamping and releasing the brake. The electric motors are typically situated directly on the brake calipers of the rear-axle wheel brakes (so-called motor on caliper). To monitor the operation of the electric motors, and in particular to calculate the clamping force of the wheel brakes, the motor speed or the temperature of the motors is customarily detected by sensors. The corresponding sensor signals are processed and evaluated by a control unit.

The signal lines between the sensors and the control unit may, under some circumstances, be very long and are therefore susceptible to electromagnetic interference, unless the signal lines are shielded separately. This may result in imprecise or incorrect measurement results. Furthermore, short circuits may occur between two signal lines which are currently detectable only with great difficulty and complexity.

SUMMARY OF THE INVENTION

An object of the present invention is therefore to provide a method with the aid of which at least one operating variable of the electric motors, for example the motor speed or temperature thereof, may be more precisely and more accurately measured.

According to the present invention, it is provided that the operating variable to be measured is not measured or not further processed in an operating state in which none of the electric motors of the parking brake is activated. One option for implementing this is, for example, to turn off the sensor system for the period in which the electric motors are inactive, or to simply not further process the measuring signal. According to the present invention, the at least one operating variable to be measured is not measured or further processed until at least one of the electric motors is activated. This has the important advantage that possible interferences which occur during the inactive state of the electric motors are ignored.

According to a preferred specific embodiment of the present invention, the at least one operating variable is measured as soon as at least one of the electric motors is activated. According to the present invention, an electric motor is preferably considered to be "activated" or "active" when the supply voltage present at the electric motor or the current flowing through the electric motor is greater than a predefined threshold value. The control signals generated by a control unit for the electric motors or, if necessary, other signals, may also be used as an alternative to detect active and inactive states of the electric motors.

The electric motors of the automatic parking brake are preferably activated in a time-offset manner. It is possible to detect signal errors, e.g., due to "crosstalk," by evaluating the sensor signals at all electric motors—including the one or more motors which has/have not yet been activated.

According to a first specific embodiment of the present invention, the at least one operating variable is measured at all electric motors simultaneously as soon as even only one of the electric motors is activated. The measurement is thus taken at the one or more electric motors which is/are still inactive. This makes it possible to check whether a signal error or sensor error has occurred at the one or more motors that has/have not yet been activated. Once the sensor system of a non-activated motor supplies, for example, a rotational speed which is implausible, a signal error is detected, and an error message to this effect is generated.

According to a second specific embodiment of the present invention, the at least one operating variable is measured only at the one or more electric motors which has/have just been activated. On the other hand, no measurement or evaluation is carried out at an inactive electric motor.

If the electric motor of the automatic parking brake is activated in a time-offset manner, the activation sequence is preferably modified multiple times. For example, the activation sequence may be reversed each time the parking brake is operated or only after each nth time the parking brake is operated.

According to the present invention, the motor temperature and/or the motor speed or a rotation angle is/are measured at each electric motor with the aid of corresponding sensors.

A control unit is preferably provided which processes the sensor signals and calculates, for example, a motor constant or a motor impedance therefrom.

BRIEF DESCRIPTION OF THE DRAWINGS

FIG. 1 shows a schematic block diagram of the key components of an automatic parking brake.

DETAILED DESCRIPTION

Figure 2A:
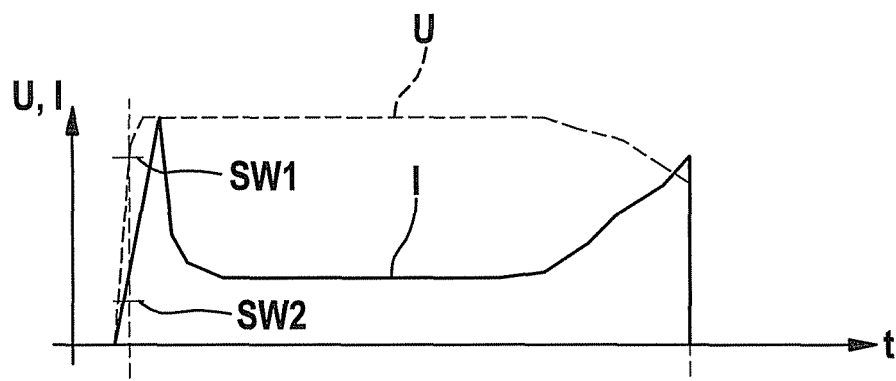
FIGS. 2a and 2b show the time curve of different parameters if the electric motors of an automatic parking brake are activated simultaneously.

FIG. 1 shows the key components of an automatic parking brake for motor vehicles. The parking brake includes two electric motors 1, 7, which are situated directly on the brake calipers of the wheel brakes of the rear axle. If the driver operates the parking brake, e.g., with the aid of a button (not shown), a control unit 6 detects the request to operate the parking brake and activates electric motors 1, 7 via corresponding control lines 12, 13 to clamp or release the wheel brakes.

The operating temperature or rotational speed of the two electric motors 1, 7 is measured with the aid of temperature sensors 2, 8 and rotational speed sensors or rotation angle sensors 3, 9. Specified sensors 2, 3, 8, 9 are connected to control unit 6 via associated signal lines 4, 5, 10, 11. For example, the motor constant or motor impedance is calculated from the measured operating variables. The clamping force of the parking brake is determined with the aid of the calculated variables as well as the instantaneous measured data.

Since signal lines 4, 5 10, 11 are customarily very long, signal interferences due to electromagnetic interference may occur. Short circuits in the signal lines may also occur. To minimize the influence of such interferences as much as possible, the sensor signals are not measured or not further processed in operating phases in which electric motors 1, 7 are not activated. To implement this, sensors 2, 3, 8, 9 may be, for example, turned off, in the operating phases in which electric motors 1, 7 are inactive. As soon as at least one of electric motors 1, 7 is activated, sensors 2, 3, 8, 9, or only a portion thereof, are then activated. As an alternative, control unit 6 could simply ignore or not further process the sensor signals in the inactive operating phases of electric motors 1, 7.

The two electric motors 1, 7 may be activated simultaneously after a parking brake request has been detected. However, they are preferably activated sequentially. For example, electric motor 1 may be activated first, followed by the other electric motor 7, or vice versa.

As soon as one of electric motors 1, 7 has been activated, associated sensors 2, 3. or 8, 9 are preferably turned on and their sensor signals evaluated. However, the sensor signals of all sensors 2, 3, 8, 9 may also be evaluated immediately as soon as one of the two electric motors 1, 7 is activated.

Figure 2B:
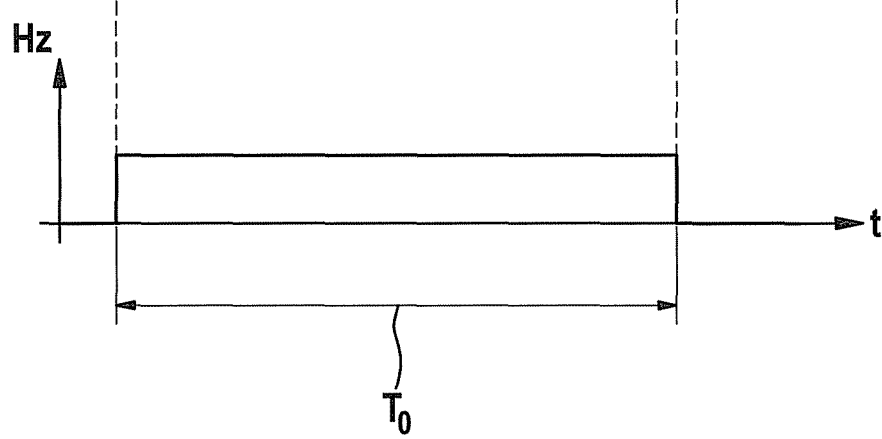

FIGS. 2a and 2b show the time curve of the most important motor parameters and the sensor signals if both electric motors 1, 7 are activated simultaneously. Since the curve of the specified parameters is approximately the same for both electric motors 1, 7, only the curve of a single electric motor is illustrated here.

FIG. 2a shows the curve of motor voltage U and motor current I during a clamping operation of the parking brake. After electric motors 1, 7 have been activated, motor voltage U and motor current I first rise steeply. As soon as one of the above-named variables exceeds an associated threshold value SW1 or SW2, electric motor 1, 7 is considered to be "activated" or "active". As soon as one of the above-named variables drops below associated threshold value SW1 or SW2, the electric motor is considered to be "inactive." The time period in which electric motors 1, 7 are active is designated $T_0$. Alternatively, the "activated" or "active" state could also be detected when control unit 6 generates a corresponding control signal.

FIG. 2b shows the signal level of rotational speed sensors 3, 9. The fact that the rotational speed is measured and further processed by control unit 6 only in phase $T_0$, in which both electric motors 1, 7 are active, is illustrated schematically. Outside of phase $T_0$, i.e., in the inactive phase, sensors 2, 3, 8, 9 are turned off, or their measuring signals are ignored by control unit 6.

Figure 3A:
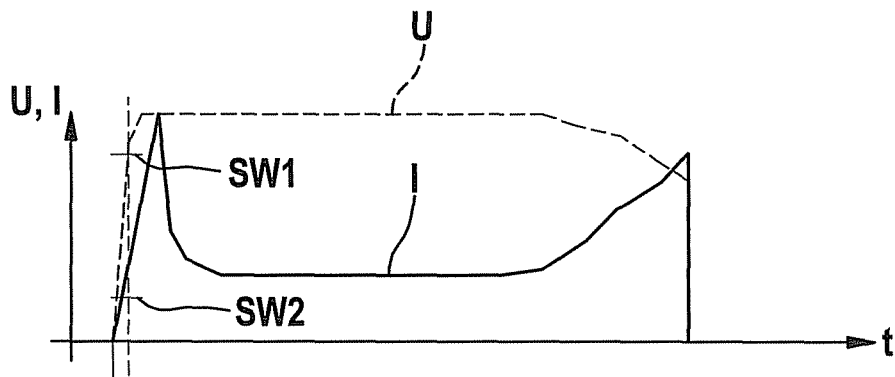
FIGS. 3a through 3c show the time curve, of different parameters if the electric motors of an automatic parking brake are activated in a time-offset manner.
Figure 3B:
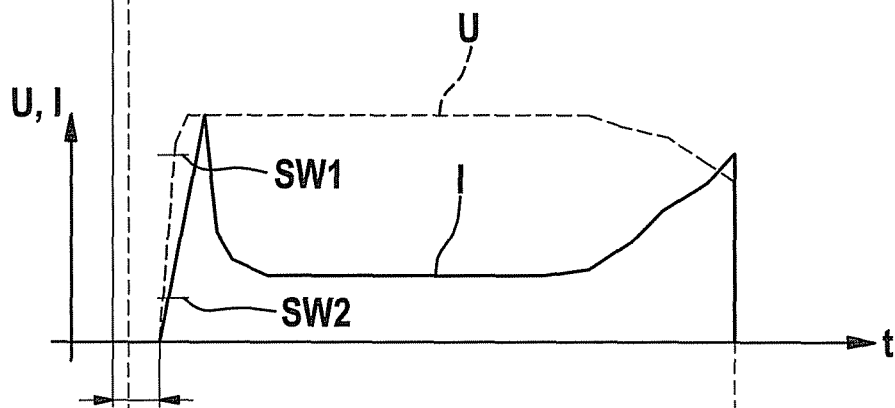
Figure 3C:
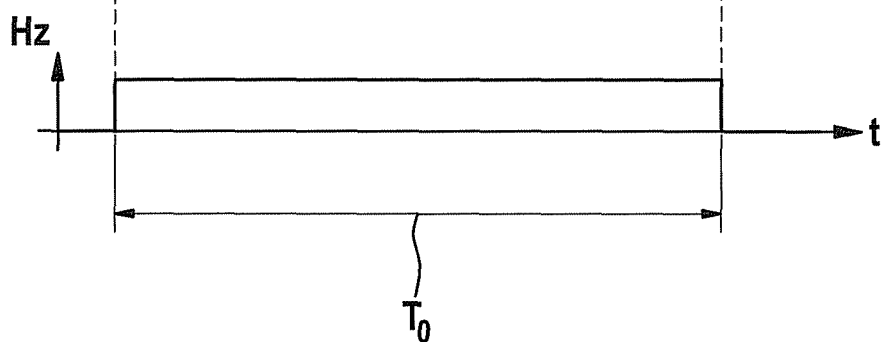

FIGS. 3a through 3c show the curve of the aforementioned parameters and measuring signals if electric motors 1 and 7 are activated in a time-offset manner. In the present example, electric motor 1 (FIG. 3a) is activated first, followed by second electric motor 7 (FIG. 3b) a short time later. The time offset may be, for example, 20 ms to 50 ms.

In the exemplary embodiment illustrated herein, the sensor signals are processed starting at the point in time at which first electric motor 1 is activated, as shown in FIG. 3c. Thus, the sensor signals of sensors 8 and 9 are also evaluated, even though second electric motor 7 is still inactive. This makes it possible, for example, to detect interferences or signal errors in the sensor signals of sensors 8 and 9.

The next time a parking brake request is made, the sequence of electric motors 1, 7 is preferably reversed, in this case second electric motor 7 being activated first, followed by first electric motor 1.

What is claimed is:

1. A method for measuring at least one operating variable at multiple electric motors of an automatic parking brake with the aid of a system of sensors for the electric motors of the automatic parking brake, the method comprising:
processing signals generated by the system of sensors for the electric motors of the automatic parking brake by a processing device; and
providing that the at least one operating variable is not measured or not further processed in an operating state in which none of the electric motors is activated.

2. The method according to claim 1, further comprising, when one of the electric motors is activated, measuring and further processing the at least one operating variable at at least one of the electric motors.

3. The method according to claim 1, further comprising activating the electric motors of the automatic parking brake in a time-offset manner 4. The method according to claim 1, further comprising, when one of the electric motors is activated, measuring the at least one operating variable at all of the electric motors.

5. The method according to claim 1, further comprising, when one of the electric motors is activated, measuring the at least one operating variable at only a presently activated electric motor.

6. The method according to claim 3, further comprising modifying a sequence in which the electric motors are activated.

7. The method according to claim 1, wherein one of the electric motors is considered to be activated if a supply voltage present at the electric motor or a current flowing through the electric motor is greater than a predefined threshold value.

8. The method according to claim 1, wherein the sensor system includes at least one of a temperature sensor, a rotational speed sensor and a rotation angle sensor.

9. A control unit for measuring at least one operating variable at multiple electric motors of an automatic parking brake with the aid of a system of sensors for the electric motors of the automatic parking brake, the control unit comprising:
a processing arrangement for processing signals generated by the system of sensors for the electric motors of the automatic parking brake by a processing device;
wherein the at least one operating variable is not measured or not further processed in an operating state in which none of the electric motors is activated.

10. The control unit according to claim 9, wherein when one of the electric motors is activated, the at least one operating variable at at least one of the electric motors is measured and further processed.

11. The control unit according to claim 9, wherein the electric motors of the automatic parking brake is activated in a time-offset manner.

12. The control unit according to claim 9, wherein when one of the electric motors is activated, the at least one operating variable at all of the electric motors is measured.

13. The control unit according to claim 9, wherein when one of the electric motors is activated, the at least one operating variable at only a presently activated electric motor is measured.

14. The control unit according to claim 11, wherein a sequence in which the electric motors are activated is modified.

15. The control unit according to claim 9, wherein one of the electric motors is considered to be activated if a supply voltage present at the electric motor or a current flowing through the electric motor is greater than a predefined threshold value.

16. The control unit according to claim 9, wherein the sensor system includes at least one of a temperature sensor, a rotational speed sensor and a rotation angle sensor.

17. The control unit according to claim 9, wherein when one of the electric motors is activated, the at least one operating variable at at least one of the electric motors is measured and further processed, wherein the electric motors of the automatic parking brake is activated in a time-offset manner, and wherein a sequence in which the electric motors are activated is modified.

18. The control unit according to claim 9, wherein when one of the electric motors is activated, the at least one operating variable at all of the electric motors is measured, wherein the electric motors of the automatic parking brake is activated in a time-offset manner, and wherein a sequence in which the electric motors are activated is modified.

19. The control unit according to claim 9, wherein one of the electric motors is considered to be activated if a supply voltage present at the electric motor or a current flowing through the electric motor is greater than a predefined threshold value, and wherein the sensor system includes at least one of a temperature sensor, a rotational speed sensor and a rotation angle sensor.

* * * * *